United States Patent
Reilly

(10) Patent No.: US 8,535,085 B1
(45) Date of Patent: Sep. 17, 2013

(54) ELECTRICAL CONNECTOR BACKSHELL ADAPTOR ASSEMBLY

(75) Inventor: Joseph M. Reilly, Manhattan, KS (US)

(73) Assignee: Event Horizon, L.L.C., Manhattan, KS (US)

(*) Notice: Subject to any disclaimer, the term of this patent is extended or adjusted under 35 U.S.C. 154(b) by 0 days.

(21) Appl. No.: 13/444,958

(22) Filed: Apr. 12, 2012

(51) Int. Cl.
*H01R 13/58* (2006.01)

(52) U.S. Cl.
USPC .......................................... 439/462

(58) Field of Classification Search
USPC .............. 439/462, 98, 584, 840, 607.01, 819, 439/349, 583
See application file for complete search history.

(56) References Cited

U.S. PATENT DOCUMENTS

| | | |
|---|---|---|
| 1,073,596 A | 9/1913 | Egerton |
| 2,285,850 A | 6/1942 | Weeks |
| 2,472,986 A | 6/1949 | Reder, Jr. |
| 3,739,076 A | 6/1973 | Schwartz |
| 4,053,200 A | 10/1977 | Pugner |
| 4,131,329 A | 12/1978 | Flatt |
| 4,213,664 A | 7/1980 | McClenan |
| 4,355,854 A * | 10/1982 | Williams ...................... 439/312 |
| 4,613,198 A | 9/1986 | Selvin et al. |
| 4,629,275 A | 12/1986 | Maul |
| 4,808,121 A | 2/1989 | Smrekar |
| 4,857,015 A | 8/1989 | Michaels et al. |
| 4,902,248 A | 2/1990 | Robertson |
| 5,028,742 A | 7/1991 | Redman |
| 5,310,359 A | 5/1994 | Chadbourne et al. |
| 5,769,665 A | 6/1998 | Reilly et al. |
| 6,811,441 B2 | 11/2004 | Simpson |
| 6,918,785 B1 | 7/2005 | Reilly |
| 7,112,094 B2 * | 9/2006 | Reilly et al. ............ 439/607.51 |
| 7,387,548 B2 | 6/2008 | Takehara et al. |
| 7,534,138 B1 * | 5/2009 | Gump et al. .................. 439/564 |
| 7,674,972 B2 * | 3/2010 | Gladd et al. .................... 174/34 |
| 8,282,429 B2 * | 10/2012 | Glick et al. .................. 439/843 |
| 2005/0090159 A1 | 4/2005 | Luther et al. |

FOREIGN PATENT DOCUMENTS

| | | |
|---|---|---|
| DE | 3311780 | 10/1984 |
| EP | 0373266 | 6/1990 |
| GB | 2199198 | 6/1988 |
| WO | WO9001225 | 2/1990 |

* cited by examiner

*Primary Examiner* — Tulsidas C Patel
*Assistant Examiner* — Phuongchi T Nguyen
(74) *Attorney, Agent, or Firm* — Kenneth H. Jack; Davis & Jack, LLC

(57) ABSTRACT

An electrical connector backshell adaptor assembly including a body having a front end, a rear end, and a hollow bore, the body's hollow bore opening at the body's front and rear end; a nipple having a front end, a rear end, and a hollow bore, the nipple's hollow bore opening at the nipple's front and rear ends, the nipple's hollow bore communicating with the body's hollow bore; and a constant force spring having a front end, a rear end, and a hollow bore, the constant force spring's hollow bore opening at the constant force spring's front and rear ends, the constant force spring being mounted within the nipple's hollow bore.

12 Claims, 6 Drawing Sheets

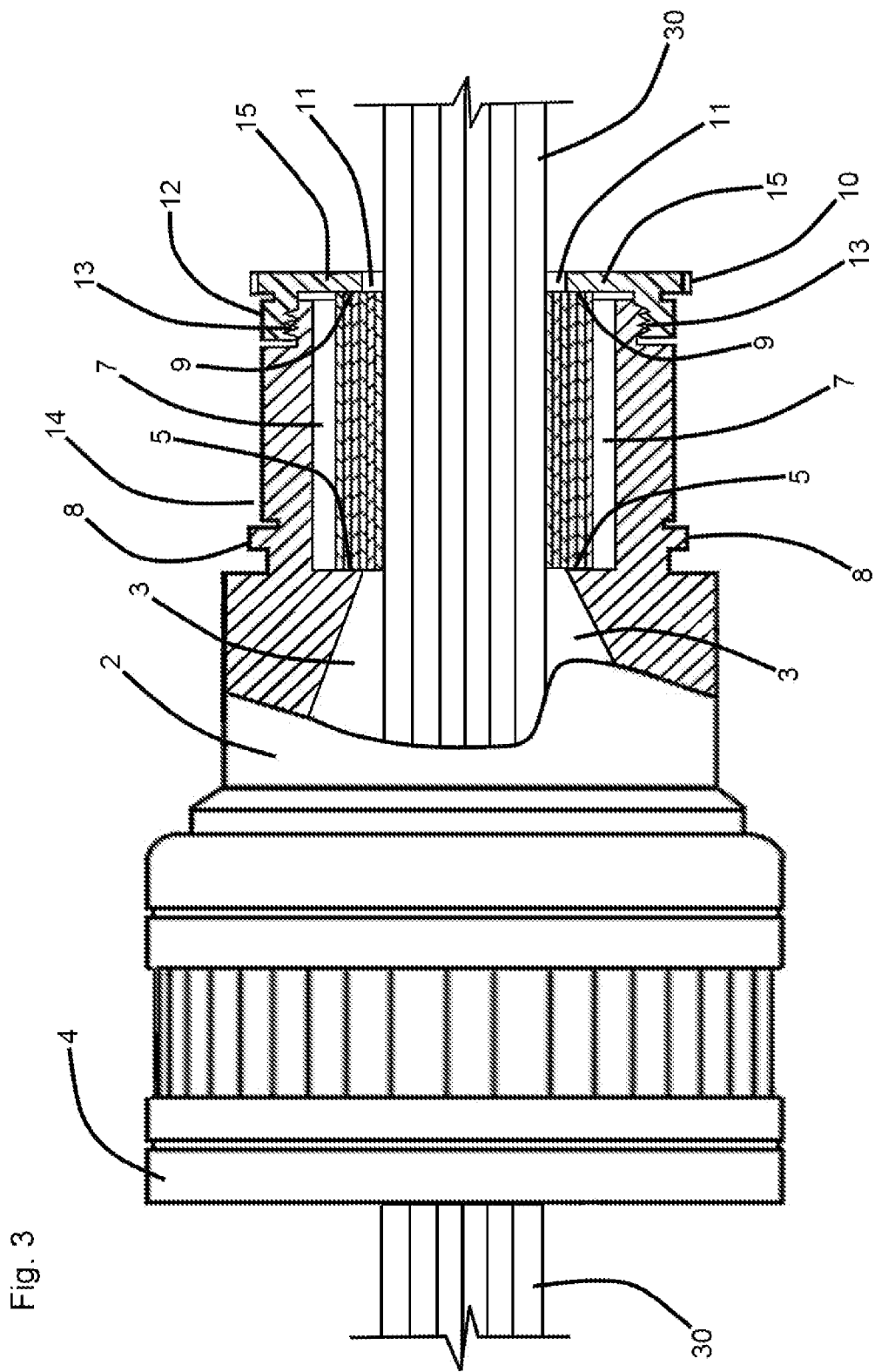

ELECTRICAL CONNECTOR BACKSHELL ADAPTOR ASSEMBLY

FIELD OF THE INVENTION

This invention relates to electrical connector backshell adaptors. More particularly, this invention relates to such adaptors which include a hollow bored cable bundle receiving nipples.

BACKGROUND OF THE INVENTION

Items of electrical equipment housed within electronic component cases and within electrical junction boxes are commonly are served by pluralities of electrically conductive cables which communicate electrical power and electronic signals to and from the electronic equipment. In many cases, it is mechanically unacceptable to extend such electrically conductive cables through a bare or unprotected port within a wall of such case or box, such bare cable passages undesirably tending to wear against and damage the electrically conductive cables. Such unprotected cable extensions also tend to insecurely support the cables, and may undesirably allow stray electromagnetic radiation to enter the box or case. Accordingly, fasteners or couplers in the form of electrical connector backshell adaptors are commonly provided for protecting the passage of such electrically conductive cables into and out of an electrical component or junction box. Such adaptors commonly further function for securely mounting and terminating a protective cable sheath which may extend over the outward extension of the electrically conductive cable.

Electrically conductive cables extending to or from such electronic component or junction boxes are commonly grouped in substantially cylindrical bundles, such bundles having widely varying outside diameters. As a result of the wide variance of outside diameters of cable bundles which may extend to and from such cases or boxes, electrical connector backshell adaptors are commonly specially fitted and sized to include a cable receiving nipple component having a particularly sized bore or inside diameter. Requirements for close fitting of nipple inside diameters undesirably require a manufacturer or supplier of electrical connector backshell adaptors to design and maintain in large inventory including a multiplicity of differently sized adaptors, each being specially sized for accommodating a particular cable bundle diameter. Such sizing practice is wasteful, and leads to difficulties to matching an inventory of electrical connector backshell adaptors with a purchasing demand which varies in accordance with varying cable bundle sizes used by the backshell adaptor purchasers and users.

Another drawback or deficiency associated with use of such commonly known electrical connector backshell adaptors relates to stray electro-magnetic radiation. Upon extension of a cable bundle through the hollow bore of the nipple of a common electrical connector backshell adapter, a hollow annulus is typically formed between the inner wall of the backshell adaptor's nipple and the underlying annular outer surface of the cable bundle. While the outward extensions of such cable bundles are commonly sheathed by a flexible wire braid tube for reduction of stray currents within the cable bundle induced by outside electromagnet radiation, some amount of undesirable electromagnetic radiation may, in any event, travel within such cable sheaths, such EMR either entering from the outside through the sheath or being generated by the cables themselves or by interconnected electronic equipment. Such internal electromagnetic radiation may undesirably travel along the cable bundle and may undesirably enter an electronic component case through the annulus which typically overlies the cable bundle and underlies the inside inner wall of the backshell adaptor's nipple.

The instant inventive electrical connector backshell adaptor solves or ameliorates the above described problems, defects, and deficiencies by specially configuring a backshell adaptor nipple to hold and deploy a constant force spring (i.e., a Hunter or Negator spring), such adaptation utilizing such constant force spring to perform an annulus packing function within the nipple.

BRIEF SUMMARY OF THE INVENTION

A first structural component of the instant inventive electrical connector backshell adaptor assembly comprises a body having a front end, a rear end, and a hollow bore, the body's hollow bore opening at the body's front and rear ends. In a preferred embodiment of the instant invention, the body comprises a straight hollow bored tube. Alternatively, the body portion, and its bore, may include a bend or turn such that the front and rear bore openings are positioned at an angle with respect to each other. For example, in a "90° adaptor", a 90° angle exists between the planes of the bore openings at the body's front and rear ends. As another example, in a "45° adaptor", a 45° angle exists between the planes of such openings.

A further structural component of the instant inventive electrical connector backshell adaptor comprises a nipple which is fixedly attached to or formed wholly with the body. Like the body portion, the nipple has a front end, a rear end, and a hollow bore, the nipple's hollow bore opening at the nipple's front and rear ends. In the preferred embodiment, the rearward opening of the body's hollow bore communicates with the frontward opening of the nipple's hollow bore.

A further structural component of the instant inventive electrical connector backshell adaptor comprises a constant force spring (i.e., a Hunter or Negator spring), such spring having a front end, a rear end, and a hollow bore, the constant force spring's hollow bore opening at such spring's front and rear ends. In the preferred embodiment, the constant force spring is operatively mounted within the nipple's hollow bore for service and function therein in the manner of an annulus packer.

In use of the instant inventive electrical connector backshell adaptor, a substantially cylindrical bundle of electrically conductive cables may be extended through the hollow bores of the body and the nipple. Upon such extension, a hollow annulus typically is defined, such annulus overlying the cable bundle and underlying the inner wall of the nipple. In the instant invention, the constant force spring component spirally extends about the cable bundle, and is longitudinally positioned therealong to fill such annulus. By filling such annulus, such spring advantageously closely fits and sizes the effective hollow bore of the nipple to match the outside diameter of the cable bundle. Upon installation, and the constant force spring further advantageously functions for blocking or absorbing stray electromagnetic radiation which might otherwise undesirably pass along the cable bundle and through the bores of the nipple and the body of the backshell adaptor.

In a preferred configuration of the instant invention, advantage is taken of the fact that a mechanically expanded constant force spring typically will, upon release, dynamically and automatically move toward or spirally spin down to a lesser diameter normal position. To functionally utilize such spring motion, the instant inventive electrical connector backshell adaptor is preferably adapted to include holding means for temporarily holding or suspending the constant force spring at such expanded configuration and for, upon extension of a cable bundle through the bores of the spring and the backshell adaptor, alternatively releasing the constant force spring for contraction toward and into annular contact with the cable bundle. Accordingly, the preferred embodiment of the instant inventive adaptor performs the nipple bore sizing function automatically.

Accordingly, objects of the instant invention include the provision of an electrical connector backshell adaptor assembly which incorporates structures, as described above, and which arranges those structures in relation to each other in the manners described above for the performance of beneficial functions as described above.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 3 redepicts FIG. 2, the view of FIG. 3 additionally showing constant force spring and cable bundle components.

DETAILED DESCRIPTION OF PREFERRED EMBODIMENTS

Figure 1:
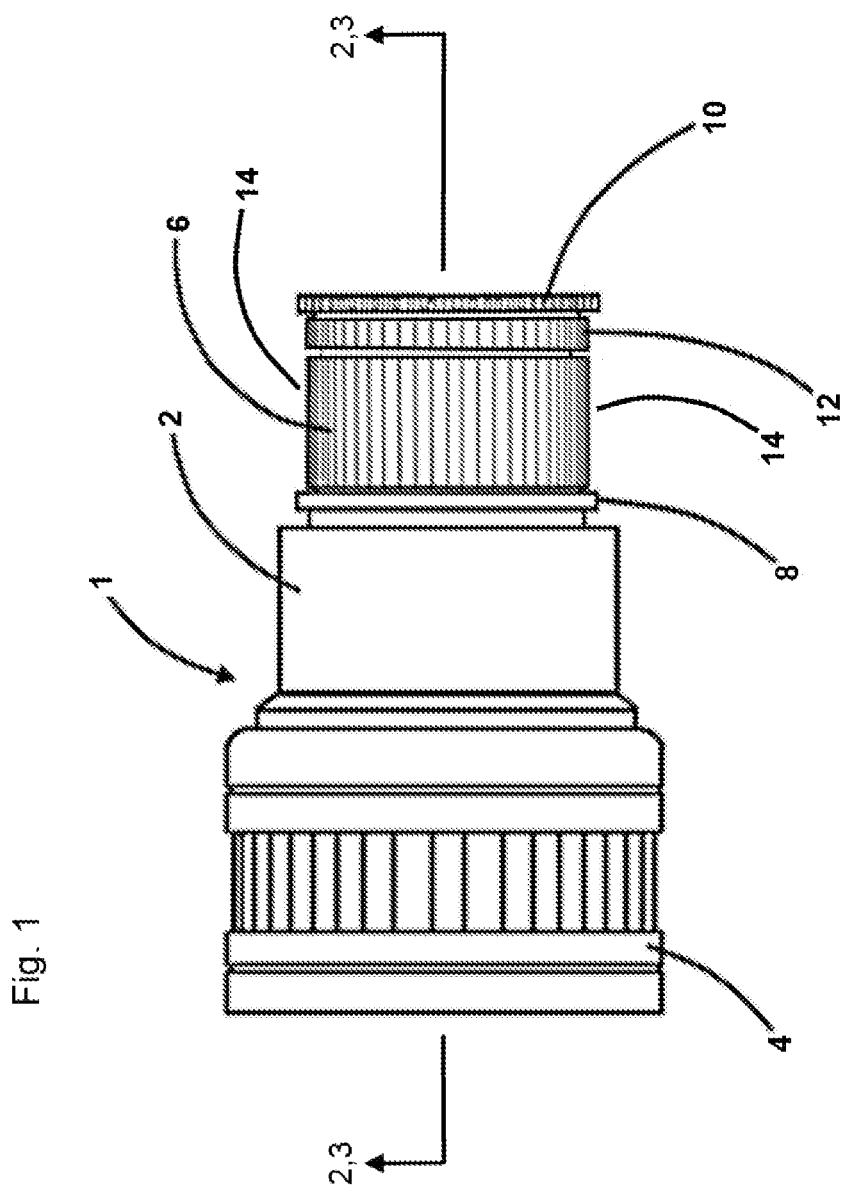
FIG. 1 is a side view of a preferred embodiment of the instant inventive electrical connector backshell adaptor assembly.

Referring now to the drawings, and in particular to FIG. 1, a preferred embodiment of the instant inventive electrical connector backshell adaptor assembly is referred to generally by Reference Arrow 1. The assembly 1 preferably has a body portion 2, having a hollow bore 3, and has a nipple portion 6, the nipple portion 6 being fixedly attached to or formed wholly with the rearward end of the body portion 2. The nipple 6 preferably comprises forward and rearward annular flanges 8 and 10, such flanges forming and defining an annular spring and braid receiving channel 14.

Figure 2:
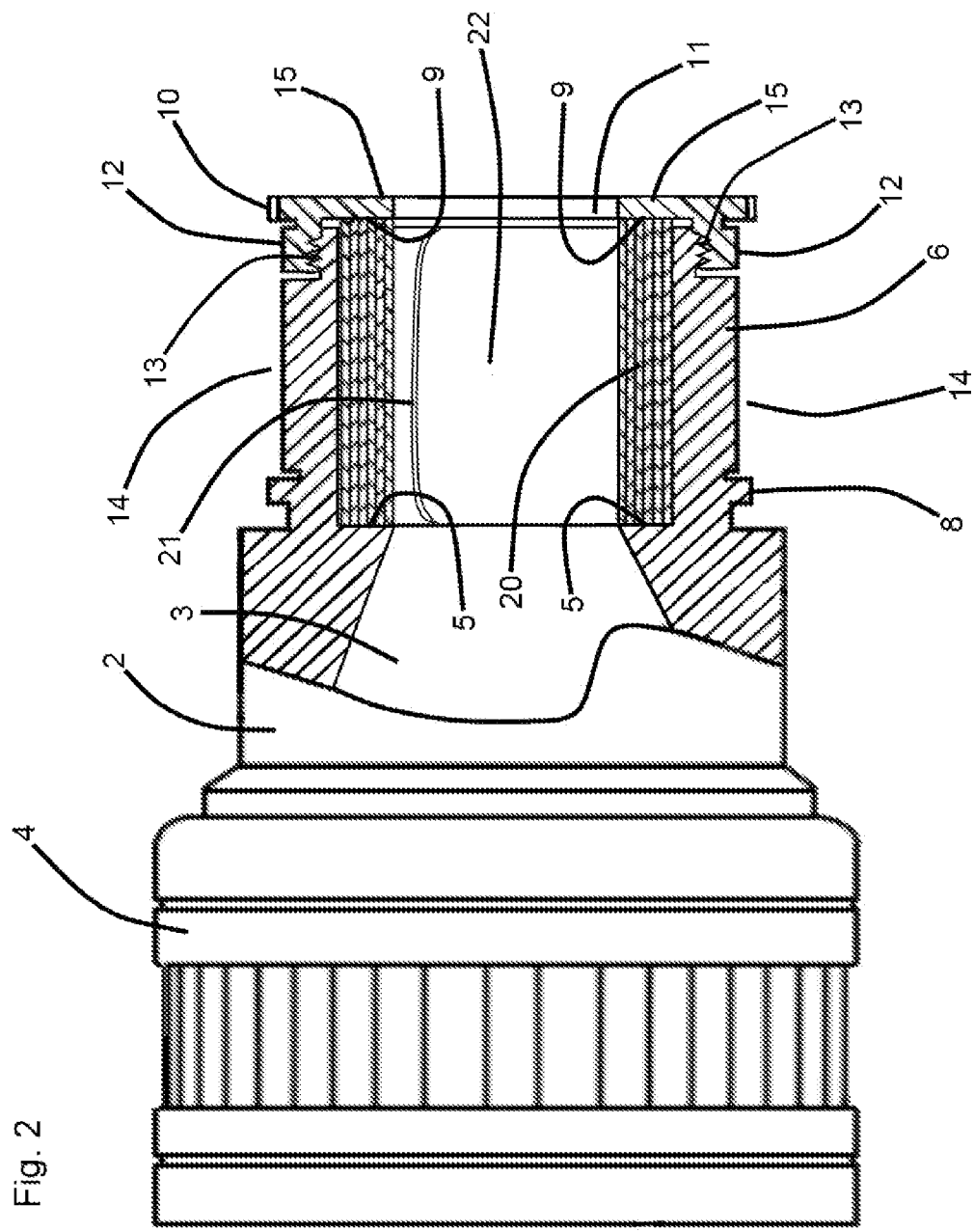
FIG. 2 is a partial sectional view as indicated in FIG. 1.

Referring simultaneously to FIGS. 1 and 2, the nipple 6 is preferably seamed or segmented to define a separate rearward section 12, such section 12 being adjustably connected by mounting means to the frontward segment of the nipple 6. In a preferred embodiment, such mounting means comprise a male and female helical threads combination 13. The extreme rearward end of nipple section 12 preferably forms and defines an inwardly extending annular flange 15, such flange 15 defining a circular opening 11.

Referring to FIG. 1, adapter mounting means, suitably in the form of a rotatable coupling nut 4, are fixedly attached to the forward end of the body 2 of the backshell adaptor 1. The rotatable coupling nut is representative of other suitable types of adapter mounting means such as mounting plates and fixed male or female helical threads.

Referring simultaneously to FIGS. 1 and 2, a constant force spring (i.e., a Hunter or Negator spring) 20 is preferably mounted within the hollow bore of the nipple 6. As depicted, the spring 20 has an inner end 21, and the several spirally wrapped turns of such constant force spring 20 designated by striations of parallel lines. As shown in the configuration of FIG. 2, the constant force spring 20 has been temporarily expanded outwardly from a normally contracted configuration having lesser inside and outside diameters. In order to suspend the spring 20 in such expanded configuration, holding means are preferably provided, such means preferably comprising a combination of a rearwardly facing annular land 5 and a frontwardly facing annular land 9. Land 5 preferably comprises a step at the rearward end of the bore 3 of the body 2, and land 9 comprises a frontward face of flange 15. In use of the instant inventive backshell adaptor assembly, referring simultaneously to FIGS. 1, 2, and 3, a bundle of electrically conductive cables 30 may be extended through the bore 7 of nipple 6, through the bore 3 of body 2, and thence through coupling nut 4, such cables 30 serving an electrical component or junction box (not depicted within views) to which coupling nut 4 may attach. As can be seen in FIG. 3, the outside diameter of the cable bundle 30 is less than the inside diameter of opening 11. Accordingly, upon such extension of the cable bundle 30, the cable bundle loosely resides within hollow bore 22 which is defined by the expanded constant force spring 20, an annular space initially existing between the inner surface of spring 20 and the outer surface of cable bundle 30. Following such cable bundle extension and positioning, an operator may grasp knurled flange 10 of nipple section 12, and may turn nipple section 12 counter-clockwise causing the helically threaded mounting means 13 to move flange face 9 rearwardly away from the rearward edges of the several turns of spring 20. Upon such turning and flange retracting motions, annular lands 5 and 9 advantageously cease functioning as longitudinally paired clamp jaws. Accordingly, upon release by the lands/jaws 5,9, the expanded spring 20 automatically moves or spirally spins inwardly toward the spring's normal smaller diameter configuration.

Referring to FIGS. 2 and 3, loading of spring 20 for temporary suspension at the position depicted in FIG. 2 may be conveniently achieved by removing nipple section 12, wrapping spring 20 about a cylindrical mandrel (not depicted) having a diameter equal to that of opening 11, inserting the mandrel and spring 20 into bore 7, sliding section 12 over a rearward end of the mandrel, screw tightening section 12 onto nipple 6 and against spring 20, and withdrawing the mandrel.

In the preferred embodiment of the instant invention, the normal or fully contracted configuration of spring 20 preferably has a slightly smaller inside diameter than the outside diameter of the smallest cable bundle 30 which might be inserted therethrough. As a result of such selected sizing of components, the turning of the nipple section 12 to initiate the clamp release function, as described above, allows the spring 20 to reconfigure itself radially inwardly to form a closely fitted sleeve or packing element which extends annularly about cable bundle 30. Accordingly, the instant inventive adapter provides for infinitely variable sizing of an effective nipple bore between the diameter of such smallest cable bundle and the diameter of opening 11.

Following the above described spring release and spring contracting steps, nipple section 12 may be oppositely turned clockwise, causing the helical threads 13 to re-clamp annular lands 5 and 9 respectively against the frontward and rearward faces of spring 20. Upon such re-clamping action, spring 20 is securely held within the bore 7 of the nipple 6 for continued function as an annulus packer which securely holds cable bundle 30 within nipple bore 7, and for continued function as an electro-magnetic radiation blocking member.

Figure 1A:
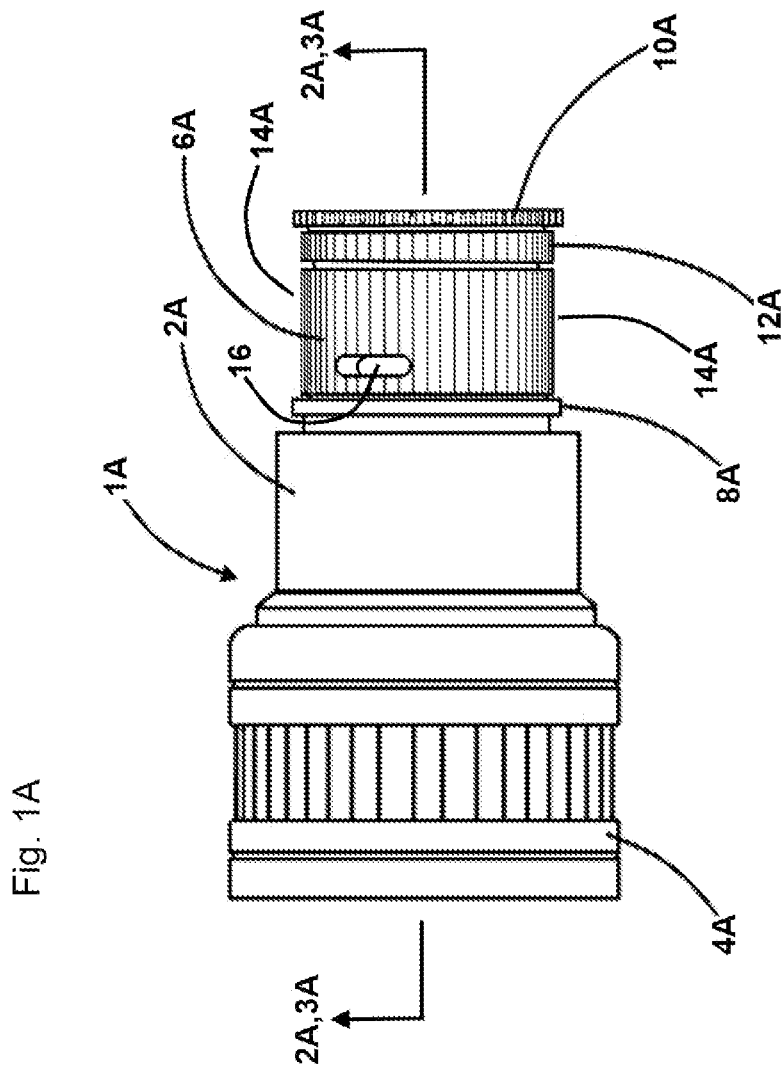
FIG. 1A redepicts the assembly of FIG. 1, the FIG. 1A view alternatively including a grounding lead extension channel.
Figure 2A:
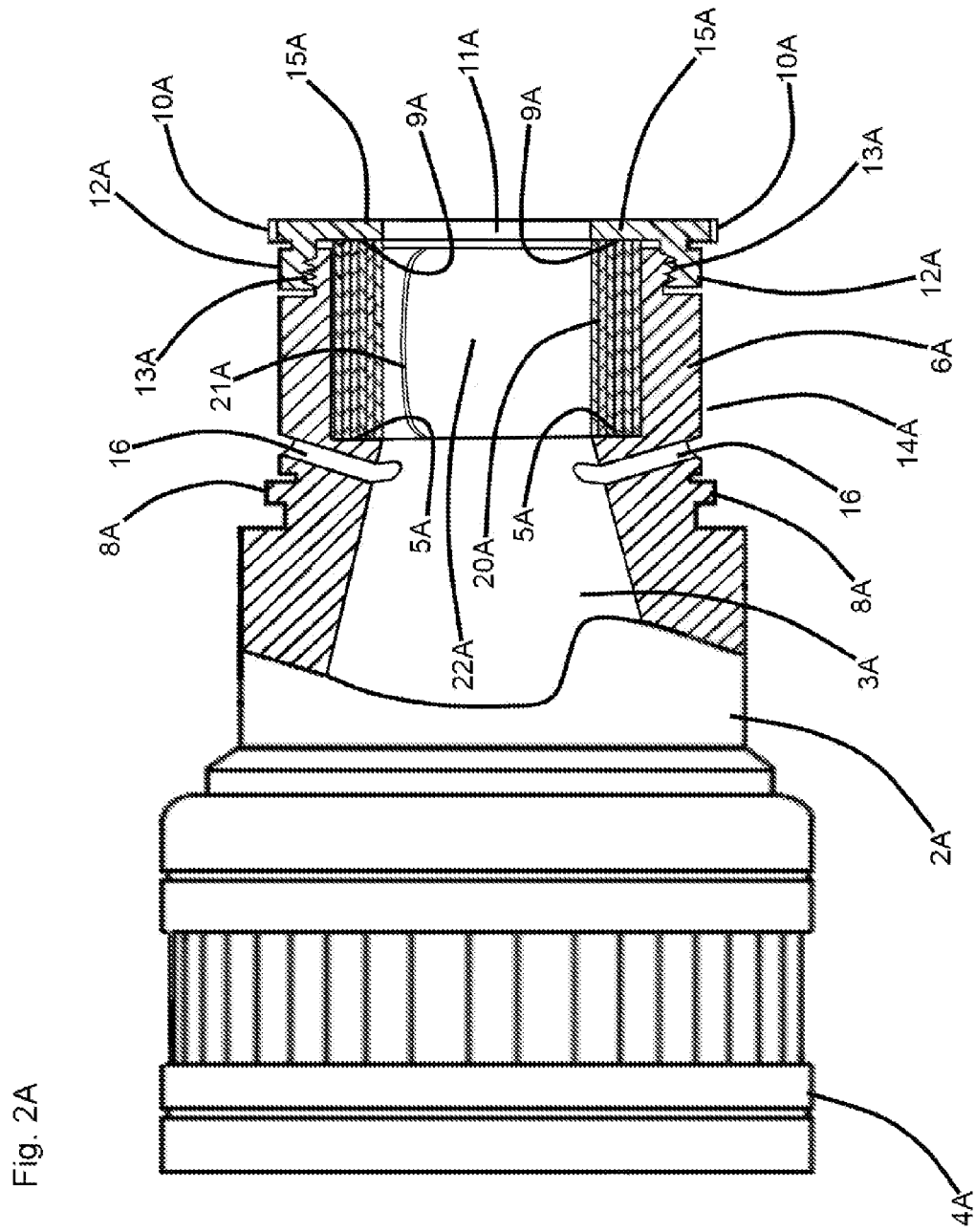
FIG. 2A is a partial sectional view as indicated in FIG. 1A.
Figure 3A:
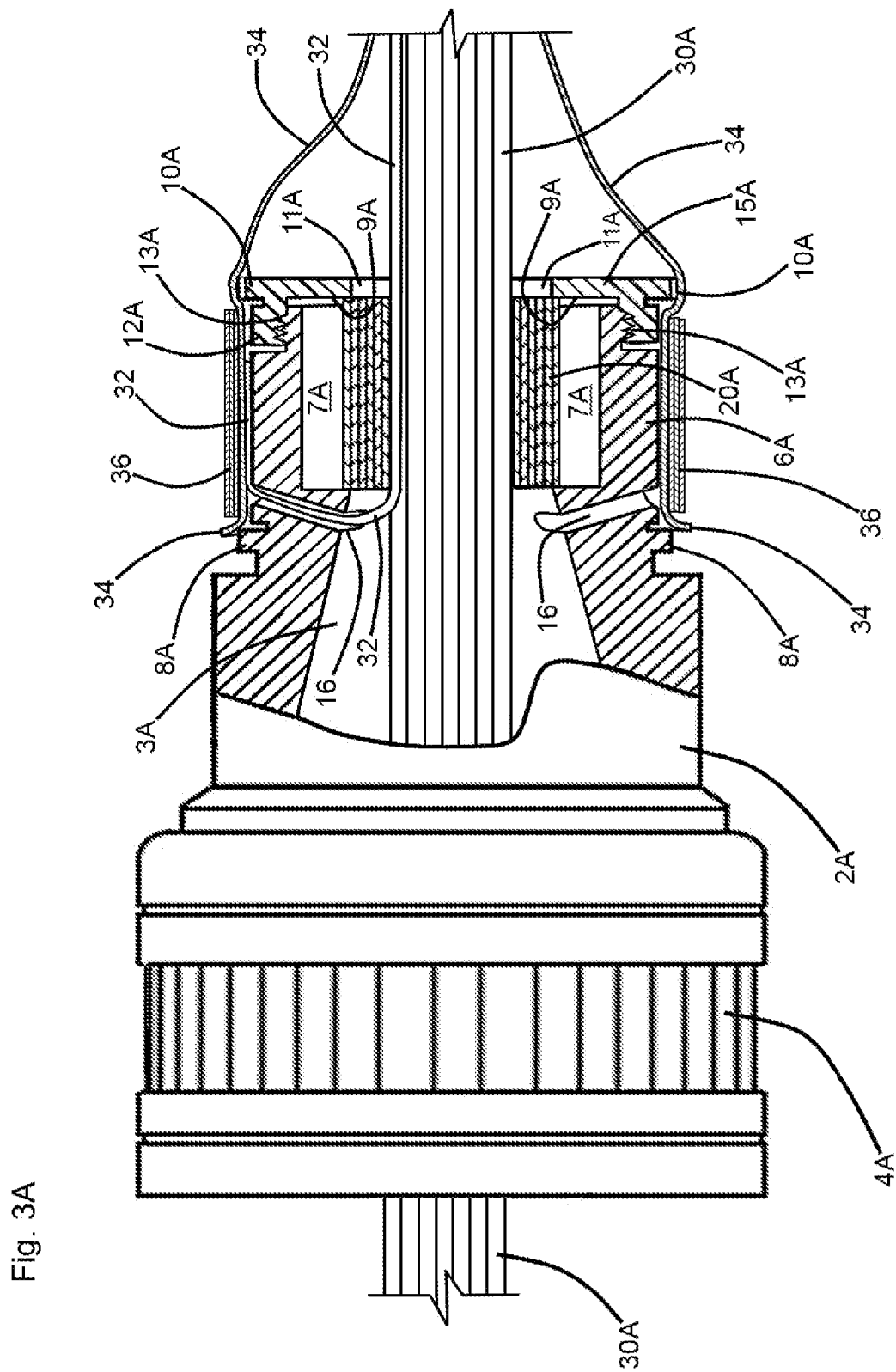
FIG. 3A redepicts FIG. 2A, the view of FIG. 3A additionally showing cable bundle, grounding lead, cable sheath, and sheath terminating spring components.

Referring simultaneously to FIGS. 1A, 2A, and 3A, each structure which is identified by a reference numeral having a suffix "A" is configured substantially similarly with similarly numbered structures appearing in FIGS. 1, 2, and 3. In the FIGS. 1A, 2A, and 3A configurations, grounding lead extension channels 16 are alternatively provided, such channels preferably opening outwardly within the annular channel 14 of nipple 6A, and opening inwardly at positions frontward from the spring stopping and clamping annular land 5A. A cable grounding wire 32 may extend outwardly through channel 16 to overlie the floor of channel 14. Thereafter, a cable sheath 34, preferably EMR blocking wire braid, may be extended over nipple 6A so that the braid's frontward end annularly overlies annular channel 14. Thereafter, a second constant force spring 36 (or other annular clamping means) may be wrapped about the nipple 6A to effectively hold the sheath 34 upon the nipple 6A, 12A, and to effectively hold, secure, and ground the end of ground wire 16 against nipple 6A.

It may be noted that the annular outer surface of flange 10,10A is knurled or roughened, and that the roughness assists in manual turning of nipple section 12,12A for actuating the helically threaded holding means 13,13A. Where a subsequently installed sheath 34 constitutes wire braid, a rough and high friction annular interface is advantageously established between the knurled surface of flange 10,10A and the inner surface of wire braid 34. Such frictional interface beneficially resists counter-rotation and loosening of the nipple section 12,12A, which might otherwise result during use of the inventive adapter within a vibrating environment. Accordingly, the invention beneficially causes the sheath 34 to function as a stop or guard against vibration induced loosening and accidental disassembly of the inventive adapter.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An electrical connector backshell adaptor assembly comprising:
    (a) a body having a front end, a rear end, and a hollow bore, the body's hollow bore opening at the body's front and rear ends;
    (b) a nipple having a front end, a rear end, and a hollow bore, the nipple's hollow bore opening at the nipple's front end and rear ends, the nipple's hollow bore communicating with the body's hollow bore; and
    (c) a constant force spring, the constant force spring having a front end, a rear end, and a hollow bore, the constant force spring's hollow bore opening at the constant force spring's front and rear ends, the constant force spring being mounted within the nipple's hollow bore;
    (d) a first stop operatively positioned frontwardly from the nipple's rear end, the first stop being adapted for resisting frontward movement of the constant force spring;
    (e) a second stop and mounting means, the mounting means positioning the second stop for resisting rearward movement of the constant force spring.

2. The electrical connector backshell adaptor assembly of claim 1, wherein the first stop comprises an annular rearwardly facing land.

3. The electrical connector backshell adaptor assembly of claim 1, wherein the mounting means comprise a male and female helical threads combination.

4. The electrical connector backshell adaptor assembly of claim 3 wherein the second stop comprises an annular frontwardly facing land.

5. The electrical connector backshell adaptor assembly of claim 4 wherein the nipple's hollow bore has an inside diameter, wherein the constant force spring has a normal outside diameter, and wherein said normal outside diameter is less than said inside diameter.

6. The electrical connector backshell adaptor assembly of claim 5 further comprising holding means operatively connected to the nipple, the holding means being adapted for, upon expansion of the constant force spring, alternatively resisting and permitting contraction of the constant force spring toward the constant force spring's normal outside diameter.

7. The electrical connector backshell adaptor assembly of claim 6 wherein the constant force spring has front and rear edges, and wherein the holding means comprise a clamp adapted for operatively engaging said edges.

8. The electrical connector backshell adaptor assembly of claim 7 wherein the holding means' clamp comprises front and rear jaws, said jaws respectively comprising the first and second stops.

9. The electrical connector backshell adaptor assembly of claim 8 further comprising grounding lead extension channel, said channel, further opening the nipple.

10. The electrical connector backshell adaptor assembly of claim 9 wherein the grounding lead extension channel is positioned frontwardly from the first stop.

11. The electrical connector backshell adaptor assembly of claim 6 wherein the constant force spring may expand and contract between a normal inside diameter position and an expanded inside diameter position, and further comprising a cable bundle having an outside diameter, the cable bundle's outside diameter being greater than the constant force spring's normal inside diameter, and the cable bundle's outside diameter being less than the constant force spring's expanded inside diameter, the cable bundle being extendable through the constant force spring's hollow bore upon expansion of the constant force spring and upon operation of the holding means to resist contraction of the constant force spring.

12. The electrical connector backshell adaptor assembly of claim 11 further comprising adaptor mounting means connected operatively to the body's front end.

* * * * *